United States Patent Office

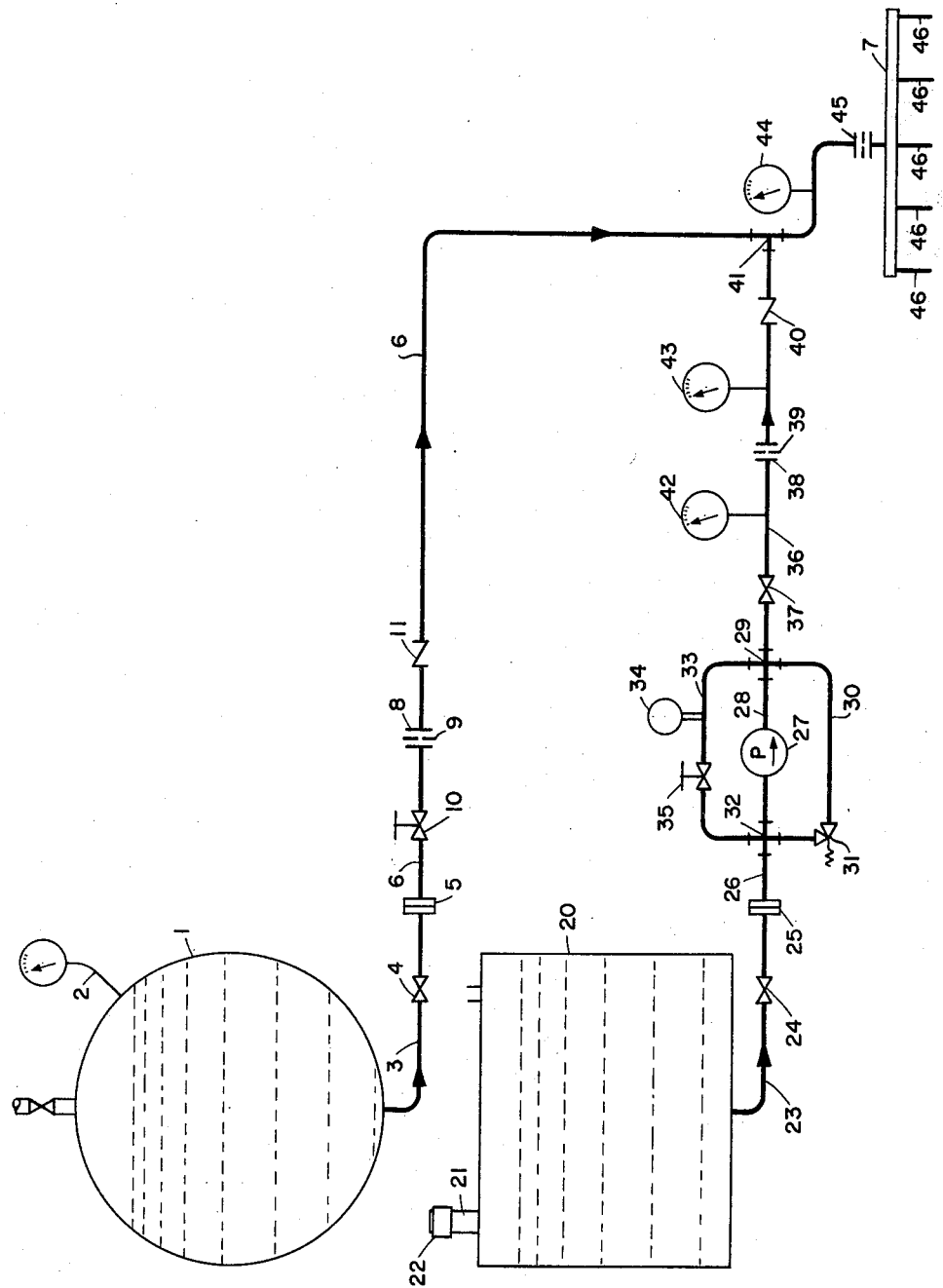

3,070,434
Patented Dec. 25, 1962

3,070,434
PROCESS FOR TREATING SOIL
James R. Turner, Berkeley, and Austin R. Cline, San Francisco, Calif., assignors to Shell Oil Company, a corporation of Delaware
Filed Feb. 2, 1959, Ser. No. 790,693
5 Claims. (Cl. 71—54)

This invention relates to a means for procuring the steady supply of a liquid material to the soil and is particularly concerned with a system of supplying a supplemental agent to a primary stream of a fluid fertilizing material being applied to the soil.

It is, at the present time, a common practice to apply ammonia to the soil either as an aqueous solution or as anhydrous ammonia. The ammonia combines with organic and inorganic constituents of the soil forming a source of plant food.

In order to apply the ammonia in regulated quantities and at a required depth in the soil, tanks or cylinders containing the ammonia are mounted on soil working machines, such as harrows or cultivators, and the ammonia fed to the soil through pipes appended to soil working tools. Apparatus for this purpose are, for example, shown and described in U.S. Patent 2,285,932—F. H. Leavitt and in U.S. Patent 2,650,556—J. R. Turner. Recently it has been found advantageous to apply sulfur to the soil in association with ammonia. This practice is particularly desirable in areas where the soil is deficient in sulfur as, for example, in some western areas of the United States. The sulfur addition is especially useful for such crops as legumes, potatoes, onions, cabbage, clover, alfalfa, wheat and cotton. The sulfur addition to soils, it is believed, also releases residual soil phosphates in alkaline soils.

One of the ways to add sulfur to the soil is to add it as liquid polysulfide. It is possible to mix the polysulfide with ammonia in a tank and then to apply the mixture to the soil. However, there are difficulties encountered such as fouling of the equipment and a rise in temperature due to reaction of the polysulfide with the ammonia. Another difficulty is the increased labor required to mix the ammonia in the tank or pressure vessel with the desired amount of polysulfide to form a uniform mixture and in cleaning the apparatus after use. It is therefore an object of our invention to provide an improved process and apparatus for mixing and applying ammonia and polysulfide to the soil simultaneously.

It is another object of our invention to provide an improved process and apparatus for feeding controlled amounts of liquid into a metered stream of a fluid fertlizer material.

The other objects and advantages of our invention will be apparent from the following detailed description of a specific embodiment of our invention throughout which reference is made to the accompanying drawing which shows a schematic flow diagram of the process and apparatus.

Numeral 1 represents a pressure vessel for maintaining ammonia in its anhydrous liquid state. The pressure vessel 1 is preferably provided with a pressure gauge 2, and outlet 3 having a shutoff valve 4. The outlet is provided with a connecting union 5 adapted to connect piping 6 leading to a distributor or manifold 7. In the piping 6 an orifice holder 8 is provided having a replaceable orifice plate 9. A valve 10 is located upstream from the orifice holder 8. Downstream from the control 10 is a check valve 11 operating so as to pass fluid from left to right (in the drawing) and to resist passage of fluid in the reverse direction. A separate vented tank 20 for the supplemental liquid is provided having a fill pipe 21, a cap 22, an outlet 23 and a shutoff valve 24. A connecting union 25 joins the tank outlet 23 to a feed pipe 26 which leads to the suction side of a suitable pump 27 driven by an electric motor, gasoline motor, or other means not shown. A pipe 28 from the pump outlet leads to a first arm of a piping crosspiece 29. To a second arm thereof, a pipe 30 leads by way of a spring-loaded by-pass relief valve 31 back to the pipe 26 connected to the suction side of the pump 27 being joined thereto by means of a piping crosspiece 32. To a third arm of the crosspiece 29 is connected a pipe 33 which leads by way of a pulsation dampener 34 and a control valve 35 back to the pipe 26 connected to the suction side of the pump being connected thereto by means of the crosspiece 32. The fourth arm of the crosspiece 29 is connected by piping 36 by way of a shut-off valve 37 to the inlet side of an orifice holder 38 having a replaceable orifice plate 39. The outlet side of the orifice holder is connected to a check valve 40 arranged to pass fluid from left to right (in the drawing) and to resist the flow of fluid from right to left. The outlet side of the check valve is connected to the ammonia flow piping 6 by a suitable T piece 41. Two pressure gauges 42 and 43 are connected into the line 36 on the upstream and downstream sides of the orifice holder 38. A third pressure gauge 44 is connected into main line 6 and is preferably located near the distributor 7. An orifice 45 is preferably located ahead of the distributor 7 to create a back pressure on the piping system and aids in effecting uniform distribution through the ammonia distribution pipes 46 leading to the soil from the manifold 7.

In operation the apparatus, schematically shown, is mounted on an agricultural ground working apparatus such as a cultivator. Anhydrous ammonia from the pressure vessel 1 passes by way of outlet 3 and valve 4, orifice 9 and valve 10 to the distributor 7. An orifice plate, having an orifice of correct size by reference to prepared tables, is used.

The regulation of the flow of polysulfide from the tank 20, which is preferably under atmospheric pressure is started by opening the valve 24 allowing the polysulfide to flow by gravity to the inlet of pump 27 which is then started up. With valve 37 open and an orifice of desired size in place in orifice holder 38 and valve 35 closed, flow of liquid through the orifice will take place and a pressure differential between the upstream and downstream side of the orifice will result. The amount of this difference can be read on the pressure gauges 42 and 43. By reference to prepared tables a desired delivery of material through the orifice 39 into the distribution line 6 leading to the distributor 7 can be obtained through the orifice by regulation of the control valve 35 to give the necessary differential pressure readings on meters 42 and 44.

The two check valves 11 and 40 are provided so that in the event of a shut-off at the distributor head being effected the ammonia stream will not be forced into the polysulfide stream metering system or the polysulfide stream forced into the ammonia metering system. The contamination of one with the other could result in a stopping up of the orifices and other damage which might require a taking down of the entire apparatus and thorough cleaning. Corrosion of various parts of the metering system could also result.

In order to insure a steady metering, a pulsation dampener 34 of well known type is included in the system for metering the polysulfide and is located in line 33 near the control valve 35. If desired, the pulsation dampener could be located in line 30 or anywhere on the outlet side of pump 27 upstream from the orifice 39.

In order to prevent rupture of the piping in case of accidental plugging or shutting off of the flow, the relief by-pass 31 from the outlet side of the pump 27 is provided so that on excessive pressure the polysulfide will circulate back to the intake side of pump 27. If desired, the relief side of the valve 31 and the return side of control valve 35 can be lead back to the tank 21.

In the drawing we have shown an anhydrous ammonia metering system employing the pressure of the ammonia in the pressure tank to meter an amount of ammonia through an orifice. Instead of such an arrangement, we may use other ammonia metering systems, for example, a positive displacement pump operated by the forward movement of the cultivator machine over the surface of the ground to be treated. Another system such as the differential pressure metering system described in U.S. Patent 2,560,948—L. S. Hannibal et al. could be also used.

The pump 27 for the polysulfide can be of any type which will develop sufficient pressure to force the polysulfide or other liquid through the orifice 39 and check valve 40 into the piping 6. In practice we have found a gear pump to be satisfactory. If desired the pump 27 may be driven by a ground wheel. Since the density and viscosity of additive solutions may vary, it is preferable to calibrate the operation in the field for each additive used. By connecting a sampling line and bleed valve into the additive feed line just above the valve 40, the amounts of additive pumped for a given number of rotations of the grounds wheel can be recovered and measured by weight or volume. The block valve 40 should be closed during such calibration and a back pressure equal or slightly greater than the ammonia line pressure registered on the pressure gauge 43. Owing to the properties of the materials being handled we have found that the equipment used should be preferably fabricated of iron or steel.

In some areas, when applying anhydrous ammonia, freezing of the distribution shanks and associated parts can take place due to the ambient temperature being insufficient to supply enough heat to the distribution shanks. As a result build-up of frozen soil on the shanks takes place resulting in ripping of the ground. By adding a supply of liquid to the anhydrous ammonia by way of the T piece 41, shank freezing and the resultant ground ripping can be prevented due to the exothermic reaction. In some cases aqueous solutions of polysulfide can be used for this purpose. In cases where no sulfur or other soil additive is needed, amounts of water can be fed from tank 20 through the metering apparatus.

Although we have shown specific preferred apparatus for metering the additive fluid and specific pumping means therefor, it will be realized that other apparatus may be substituted within the spirit of our invention as defined in the appended claims.

Besides ammonium polysulfide other polysulfides could be used such as calcium polysulfide, sodium polysulfide or potassium polysulfide or mixtures of such polysulfides depending on the soil deficiency.

We claim as our invention:

1. Process for fertilizing soil simultaneously with sulphur and with fixed nitrogen comprising passing a major stream of liquid anhydrous ammonia under liquifaction pressure and approximately ambient temperature from a pressure tank through a pressure reducing orifice and through check valve means to prevent return of mixed fluid under pressure to said orifice, pumping a minor stream of aqueous solution containing polysulfide suitable for soil treatment through a second pressure reducing orifice and through check valve means to prevent return of fluid under pressure to said second orifice, maintaining both streams in continuous motion, mingling both streams into a commingled continuously moving stream, and passing said commingled streams directly through a third pressure reducing orifice, at low pressure, into the soil to be treated.

2. A process as in claim 1 in which the polysulfide solution is ammonium polysulfide.

3. A process as in claim 1 in which the polysulfide solution is calcium polysulfide.

4. A process as in claim 1 in which the polysulfide solution is sodium polysulfide.

5. A process as in claim 1 in which the polysulfide solution is potassium polysulfide.

References Cited in the file of this patent

UNITED STATES PATENTS

| | | |
|---|---|---|
| 2,231,423 | Horsley et al. | Feb. 11, 1941 |
| 2,255,026 | Keenen | Sept. 2, 1941 |
| 2,255,027 | Keenen | Sept. 2, 1941 |
| 2,598,121 | Hannibal | May 27, 1952 |
| 2,650,556 | Turner | Sept. 1, 1953 |
| 2,739,738 | Jauch | Mar. 27, 1956 |
| 2,781,612 | Dugan | Feb. 19, 1957 |
| 2,878,969 | Griswold | Mar. 24, 1959 |